US010645264B2

(12) United States Patent
Sakamoto

(10) Patent No.: US 10,645,264 B2
(45) Date of Patent: May 5, 2020

(54) IMAGE PICKUP APPARATUS AND HARNESS-SIDE CONNECTOR

(71) Applicant: IRISO ELECTRONICS CO., LTD., Kanagawa (JP)

(72) Inventor: Tetsuma Sakamoto, Kanagawa (JP)

(73) Assignee: IRISO ELECTRONICS CO., LTD., Kanagawa (JP)

( * ) Notice: Subject to any disclaimer, the term of this patent is extended or adjusted under 35 U.S.C. 154(b) by 0 days.

(21) Appl. No.: 15/638,916

(22) Filed: Jun. 30, 2017

(65) Prior Publication Data
US 2018/0077323 A1 Mar. 15, 2018

(30) Foreign Application Priority Data

Sep. 13, 2016 (JP) ................ 2016-178254

(51) Int. Cl.
| | | |
|---|---|---|
| *H04N 5/225* | (2006.01) | |
| *H01R 13/504* | (2006.01) | |
| *H01R 13/66* | (2006.01) | |
| *H01R 13/631* | (2006.01) | |
| *H01R 31/06* | (2006.01) | |
| *H01R 13/436* | (2006.01) | |
| *H01R 24/60* | (2011.01) | |

(52) U.S. Cl.
CPC ....... *H04N 5/2253* (2013.01); *H01R 13/5045* (2013.01); *H01R 13/6315* (2013.01); *H01R 13/6658* (2013.01); *H01R 13/6691* (2013.01); *H04N 5/2252* (2013.01); *H04N 5/2257* (2013.01); *H01R 13/4361* (2013.01); *H01R 24/60* (2013.01); *H01R 31/06* (2013.01)

(58) Field of Classification Search
CPC ............. H01R 13/6315; H01R 13/631; H01R 13/5045; H01R 13/6658; H01R 13/6691; H01R 13/4361; H01R 31/06; H01R 24/60; H04N 5/2253; H04N 5/2252; H04N 5/2257
USPC .................................. 439/247, 248
See application file for complete search history.

(56) References Cited

U.S. PATENT DOCUMENTS

| | | | | |
|---|---|---|---|---|
| 4,334,732 A * | 6/1982 | Roeschlein | ........ | H01R 13/6315 439/248 |
| 4,580,862 A * | 4/1986 | Johnson | ................ | H01R 24/52 439/248 |
| 4,815,986 A * | 3/1989 | Dholoo | ............... | H01R 13/631 439/248 |
| 4,963,098 A * | 10/1990 | Myer | .................. | H01R 13/514 439/248 |
| 5,755,584 A * | 5/1998 | Kodama | ............ | H01R 13/6315 439/248 |

(Continued)

FOREIGN PATENT DOCUMENTS

JP 2009-099411 A 5/2009

*Primary Examiner* — Gary F Paumen
(74) *Attorney, Agent, or Firm* — Cermak Nakajima & McGowan LLP; Tomoko Nakajima

(57) ABSTRACT

To reduce a size of an image pickup apparatus including a connector that has a terminal having a positional displacement absorption function. A harness-side connector of an image pickup apparatus includes a movable housing that holds a harness-side terminal, a movable gap in which the movable housing can be displaced, and an accommodation portion that accommodates the movable housing in a displaceable manner, the movable housing being displaceable owing to flexibility of a core wire.

4 Claims, 7 Drawing Sheets

(56) References Cited

U.S. PATENT DOCUMENTS

| | | | | |
|---|---|---|---|---|
| 5,857,863 | A * | 1/1999 | Onizuka | B60K 37/02 439/248 |
| 6,027,360 | A * | 2/2000 | Jenkins | H01R 13/6215 439/248 |
| 6,152,758 | A * | 11/2000 | Matsuoka | H01R 13/6215 439/247 |
| 6,659,787 | B2 * | 12/2003 | Hayashi | H01R 13/74 439/247 |
| 7,121,888 | B2 * | 10/2006 | Brandt | H01R 13/512 439/248 |
| 7,147,359 | B2 * | 12/2006 | Ranish | F27B 17/0025 362/278 |
| 7,614,897 | B2 * | 11/2009 | Lopez | H01R 13/516 439/248 |
| 8,585,421 | B2 * | 11/2013 | Yamaguchi | H01R 13/05 439/248 |
| 8,672,696 | B2 * | 3/2014 | Sakurai | H01R 13/6315 439/247 |
| 2001/0019912 | A1 * | 9/2001 | Kain | H01R 12/724 439/247 |
| 2005/0032406 | A1 * | 2/2005 | Shiota | H01R 13/6315 439/247 |

* cited by examiner

IMAGE PICKUP APPARATUS AND HARNESS-SIDE CONNECTOR

BACKGROUND OF THE INVENTION

1. Field of the Invention

The present disclosure relates to an image pickup apparatus, such as an onboard camera, and a connector.

2. Description of the Related Art

Small-sized image pickup apparatuses in which a solid-state image pickup element is mounted are used. The small-sized image pickup apparatuses include an onboard camera used in a drive recorder of a vehicle or used to improve the visibility of the rear side of the vehicle, and a surveillance camera used for crime prevention in banks, stores, and the like.

Conventional small-sized image pickup apparatuses typically include a box-shaped housing including a front housing in which a substrate on which a solid-state image pickup element is mounted is built in, and a rear housing that holds an electric wire connected to the substrate. In the housing, the substrate and the electric wire are in conductive communication with each other through a connector. The connector includes a substrate-side connector mounted on the substrate, and a harness-side connector that is in conductive communication with the substrate-side connector.

In such conventional image pickup apparatuses, the front housing and the rear housing are assembled together so that the substrate-side connector and the harness-side connector are in conductive communication with each other. However, since the accuracy of the fitting positions are affected by the assembly accuracy between the front housing and the rear housing, the assembly accuracy between the substrate and the front housing, and the like, it is difficult to perform fitting and connecting without any positional displacement in the fitting position. Accordingly, an image pickup apparatus is known that includes a connector provided with a function that absorbs the positional displacement of the fitting position (Japanese Unexamined Patent Application Publication No. 2009-99411, FIG. 12). A substrate-side connector included in the above image pickup apparatus absorbs the deviation in the fitting position in a direction intersecting the insertion direction of the mating terminal that is a connection object by having a contact of a terminal of the substrate-side connector perform elastic deformation.

SUMMARY OF THE INVENTION

However, the substrate-side connector described above has a problem in that the size, particularly in a planar direction (X direction and Y direction), becomes large due to the structure of the terminals for achieving the characteristic function of absorbing the positional displacement of the fitting position. In the substrate-side connector (43) described above, a contact (47a) of each terminal is positioned inside a fitting chamber of the substrate-side housing (45) into which a mating terminal is inserted. Each terminal (47) includes a substrate connection (47b) that protrudes outside of the substrate-side housing (45) through an inverted U-shaped movable piece (47c) that is bent outwards with respect to the fitting chamber from the contact (47a). As described above, since the direction in which the terminal is bent forms an outwardly bent shape that is oriented towards the outside of the substrate-side housing from the inside of the fitting chamber, the substrate-side housing that accommodates each terminal becomes large in shape and the substrate connection greatly protrudes outside the lateral side of the substrate-side housing. As a result, the projected area of the substrate-side connector with respect to the substrate becomes large, and due to the increase in size of the substrate, the image pickup apparatus becomes large in size as well.

The present disclosure has been made in such a circumstance of the conventional image pickup apparatuses described above. An object thereof is to reduce the size of an image pickup apparatus including a connector having a function of absorbing a positional displacement of a fitting position.

In order to achieve such an object, the present disclosure includes an image pickup apparatus and a harness-side connector having the following characteristics.

The present disclosure is an image pickup apparatus including a first housing, a second housing, a substrate-side connector provided in the first housing, a movable housing that is provided in the second housing, the movable housing being fitted and connected to the substrate-side connector, and a linear conductor that has flexibility and that supports the movable housing in a displaceable manner.

Furthermore, the present disclosure is a harness-side connector that is provided in an image pickup apparatus including a first housing, a second housing, a substrate-side connector provided in the first housing, the harness-side connector being fitted and connected to the substrate-side connector, the harness-side connector includes a movable housing that is provided in the second housing, the movable housing fitted and connected to the substrate-side connector, and a linear conductor that has flexibility and that supports the movable housing in a displaceable manner.

Since the image pickup apparatus and the harness-side connector of the present disclosure include the movable housing provided in the second housing and that is fitted and connected to the substrate-side connector, and the linear conductor that has flexibility and that supports the movable housing in a displaceable manner, the positional displacement of the fitting position with respect to the substrate-side connector can be absorbed by displacement of the movable housing caused by bending of the flexible linear conductor. Accordingly, since the positional displacement of the fitting position can be absorbed without providing, in the substrate-side connector, a movable structure that absorbs the positional displacement of the fitting position, or a movable structure including terminals formed of movable springs that bend to the harness-side connector, the substrate-side connector and the harness-side connector can have a simple structure and can be reduced in size, which leads to saving the space of the mounting surface of the substrate and, as a result, enables reduction in the size of the image pickup apparatus as well. As described above, the present disclosure is capable of providing a new image pickup apparatus and a new harness-side connector that perform a function of absorbing the positional displacement of the fitting position with a floating function of the movable housing achieved by bending of the linear conductor.

The linear conductor of the present disclosure may have flexibility bending the linear conductor in a direction of an axis thereof and in a direction that intersects the axis.

According to the present disclosure, since the linear conductor has flexibility that bends in the axial direction and in the direction intersecting the axis, the movable housing can be displaced in three-dimensional directions that moves the movable housing in the axial direction and the direction intersecting the axis. The linear conductor of the present disclosure may be a cable (core wire) including a conducting wire having an insulating covering. The cable may be either a single-core cable or a multi-core cable. In a case of a multi-core cable, a plurality of cables may be exposed from the sheaths.

The present disclosure includes a fixed housing that includes an accommodation portion that accommodates the movable housing in a displaceable manner.

According to the present disclosure, since the movable housing is displaced inside the accommodation portion of the fixed housing, the movable housing is not excessively displaced and can be displaced in a predetermined movable area. The movable housing can be displaced in an area defined by the movable gap formed with the inner surface of the accommodation portion.

The fixed housing of the present disclosure includes an insertion portion that accommodates the linear conductor in a displaceable manner.

According to the present disclosure, since the fixed housing includes the insertion portion that accommodates the linear conductor in a displaceable manner, an accommodation space in which the linear conductor is bent is formed inside the insertion portion, such that a movable gap is formed between the inner surface of the insertion portion and the linear conductor. During fitting and connecting the movable housing and the substrate-side connector to each other, the movable housing receives insertion force, and due to the insertion force, the linear conductor is bent in the accommodation space including the movable gap; accordingly, the insertion force transmitted from the substrate-side connector to the substrate causing the deformation of the substrate can be buffered.

According to the image pickup apparatus and the harness-side connector of the present disclosure, the positional displacement of the fitting position with respect to the substrate-side connector can be absorbed by displacement of the movable housing caused by bending of the flexible linear conductor. Accordingly, since the positional displacement of the fitting position can be absorbed without providing, in the substrate-side connector, a movable structure that absorbs the positional displacement of the fitting position, the substrate-side connector can have a simple structure and can be reduced in size, which leads to saving the space of the mounting surface of the substrate and, as a result, enables reduction in the size of the image pickup apparatus as well.

BRIEF DESCRIPTION OF THE DRAWINGS

FIG. 1A is an explanatory drawing illustrating an exploded state thereof and FIG. 1B is an explanatory drawing illustrating an assembled state.

FIG. 7A is a drawing illustrating a state in which the movable housing is displaced in a Y direction, FIG. 7B is a drawing illustrating a state in which the movable housing is displaced obliquely, and FIG. 7C is a drawing illustrating a state in which the movable housing is displaced in a Z direction.

DESCRIPTION OF THE PREFERRED EMBODIMENTS

Figure 2:
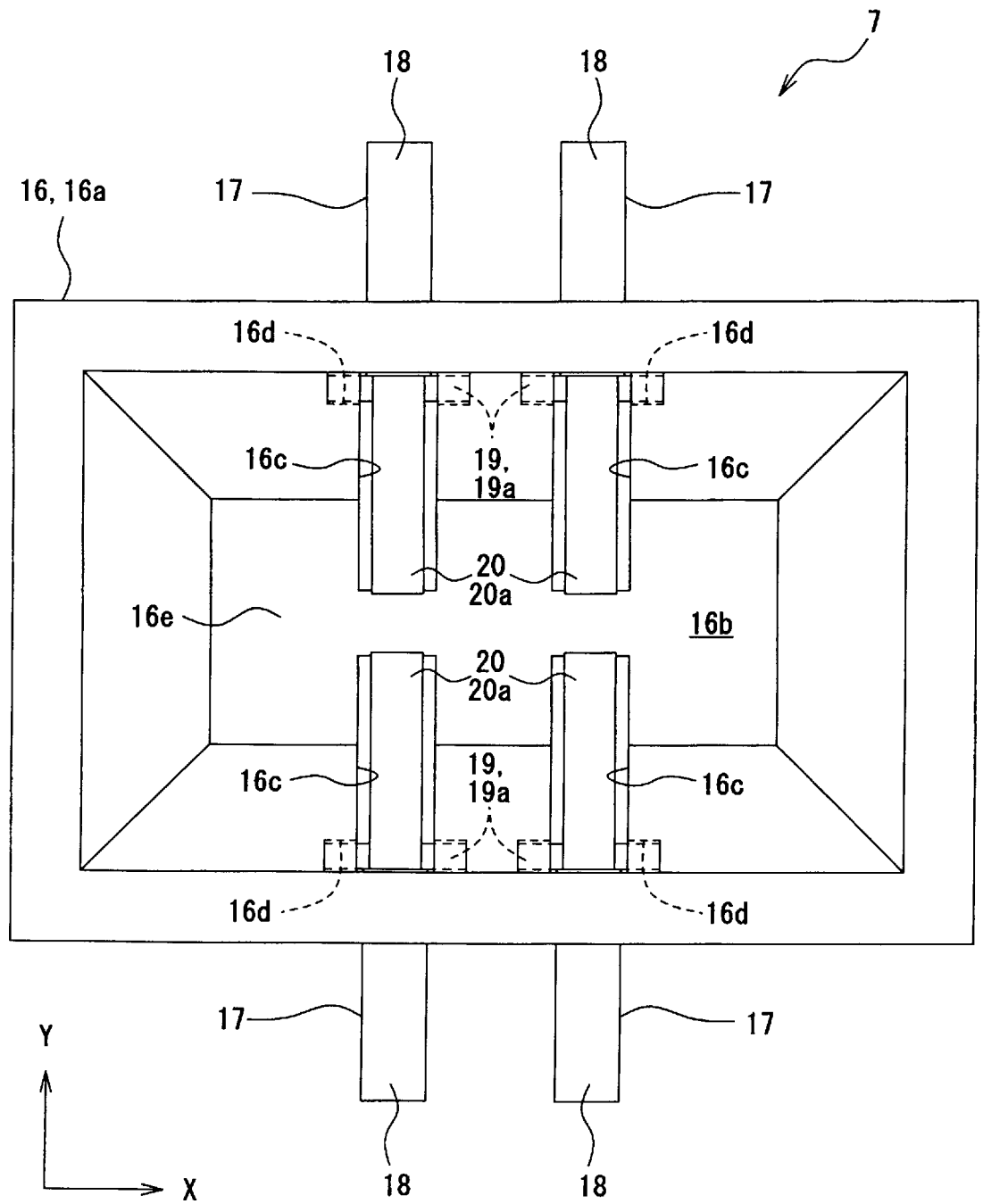
FIG. 2 is a plan view of a substrate-side connector in FIGS. 1A and 1B.

Hereinafter, an exemplary embodiment of an image pickup apparatus and a harness-side connector of the present disclosure will be described with reference to the drawings. In the description, claims, and the drawings, a width direction or a left-right direction of a substrate-side connector illustrated in FIG. 2 is referred to as an X direction, a front-rear direction is referred to as a Y direction, and a height direction that is perpendicular to the sheet surface is referred to as a Z direction. Furthermore, description will be given while the side of the right side surface in the X direction is referred to as the "right", the side of the left side surface is referred as the "left", the front surface in the Y direction is referred to as the "front", the rear surface is referred to as the "rear", the upper surface in the Z direction is referred to as "up", and the bottom surface is referred to as "down". However, such a specification related to the left, right, front, rear, up, and down does not limit the image pickup apparatus of the present disclosure, the mounting direction of the substrate-side connector and the harness-side connector, and the direction in which the substrate-side connector and the harness-side connector are used.

1. Description of Image Pickup Apparatus 1

Figure 1A:
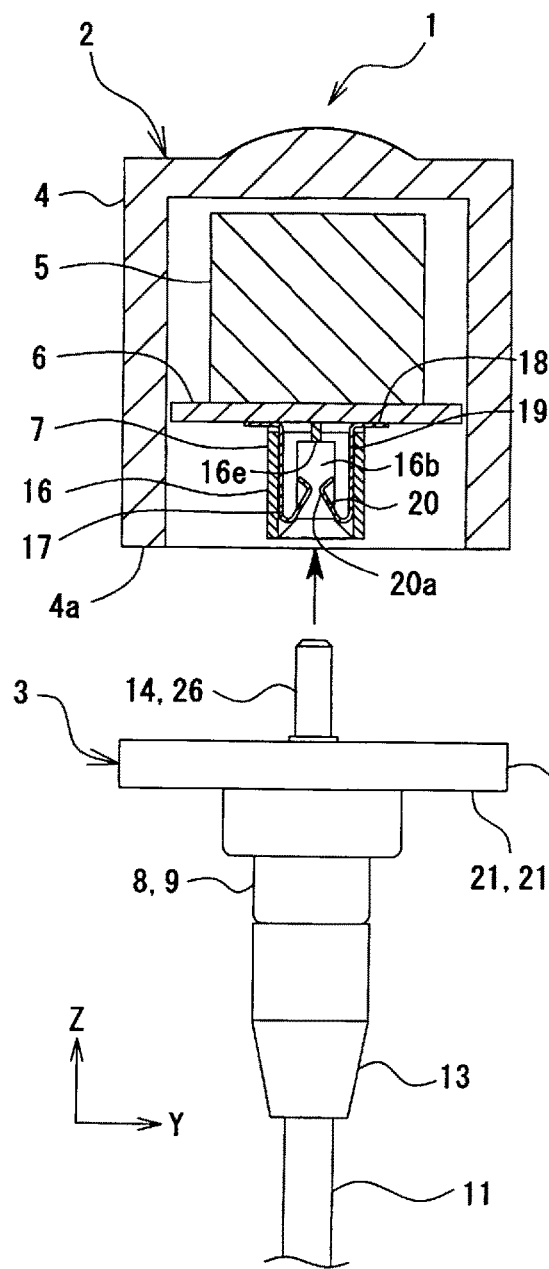
FIGS. 1A and 1B are explanatory drawings of an image pickup apparatus according to an exemplary embodiment.
Figure 1B:
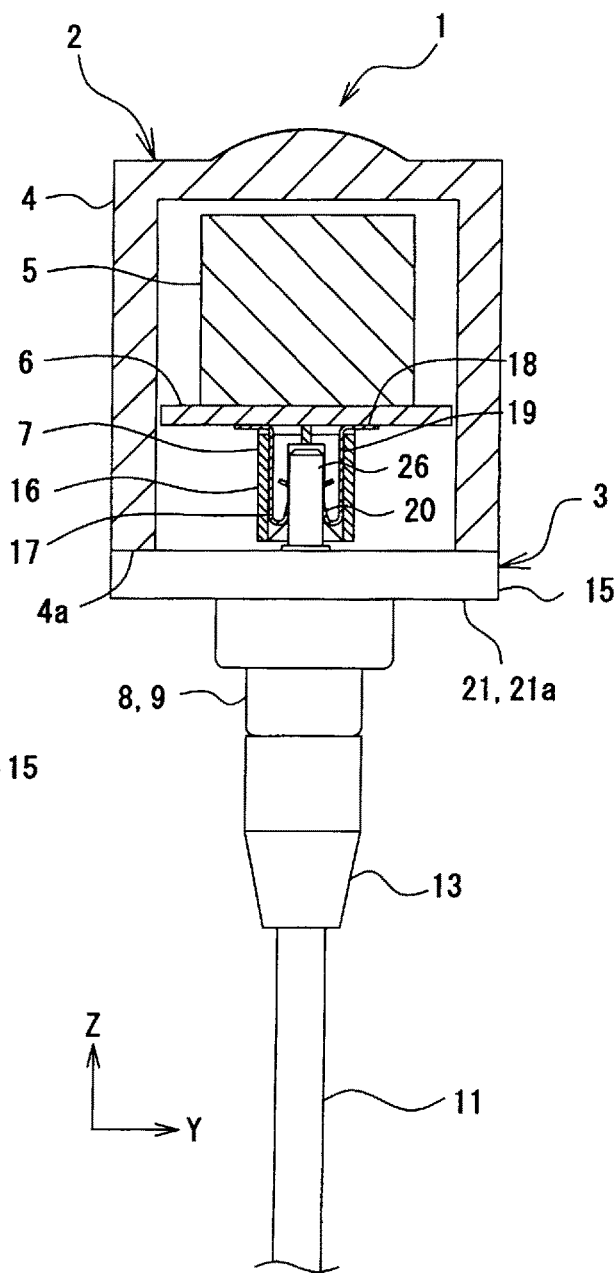

As an outline of an image pickup apparatus 1 is illustrated in FIGS. 1A and 1B, the image pickup apparatus 1 includes a body-side component 2 and a harness-side component 3.

The body-side component 2 includes a front housing 4 that constitutes a portion of a housing of the image pickup apparatus 1. An optical system component 5 including a solid-state image pickup element, a circuit board for a signal processing system, and the like, a substrate 6 fixed to the front housing 4, and a substrate-side connector 7 that is one of the connectors included in the image pickup apparatus 1 are housed inside the front housing 4. The front housing 4 constitutes a "first housing" of the present disclosure.

The harness-side component 3 includes a rear housing 8 that constitutes a portion of the housing of the image pickup apparatus 1. The rear housing 8 constitutes a "second housing" of the present disclosure. The rear housing 8 includes a fixed housing 9 that closes an opening end 4a of the front housing 4, and a movable housing 10. Reference numeral 11 is a multi-core cable serving as a "linear conductor". Harness-side terminals 12 are fitted to the distal end of the multi-core cable 11. Reference numeral 13 is a sealing member made of synthetic resin. Furthermore, the fixed housing 9, the movable housing 10, and the harness-side terminals 12 constitute a harness-side connector 14. Furthermore, the fixed housing 9 and the movable housing 10 constitute a harness-side housing 15.

The body-side component 2 and the harness-side component 3 are fixed to each other with a fixing member, such as physical means such as a bolt or chemical means such as an adhesive, while a plate surface of the fixed housing 9 of the rear housing 8 is abutted against the opening end 4a of the front housing 4. In performing the above fixing, the harness-side connector 14 of the harness-side component 3 is fitted and connected to the substrate-side connector 7 of the body-side component 2. In so doing, there are cases in which relative positional displacement occurs in the fitting position between the substrate-side connector 7 and the harness-side connector 14. It is the image pickup apparatus 1 that is capable of absorbing the positional displacement, and the main member carrying out such a function is the harness-side connector 14. Accordingly, a specific structure, function, and effects thereof will be described below.

2. Description of Substrate-Side Connector 7

The substrate-side connector 7 includes a substrate-side housing 16 and substrate-side terminals 17. The substrate-side connector 7 is mounted on the substrate 6, and is in conductive communication with the optical system component 5, such as the solid-state image pickup element.

(1) Description of Substrate-Side Housing 16

The substrate-side housing 16 includes a polygonal tube-shaped wall portion 16a, and a fitting chamber 16b that is in conductive communication with the harness-side connector 14 is formed therein. A plurality of terminal holding portions 16c are formed in longitudinal inner walls of the fitting chamber 16b that face each other (FIG. 2). The terminal holding portions 16c are each formed so as to have a groove shape, and the substrate-side terminals 17 are held by the terminal holding portions 16c.

(2) Description of Substrate-Side Terminals 17

A substrate connection 18, a base portion 19, and a contact spring piece 20 are formed in each of the substrate-side terminals 17. The substrate connection 18 is a portion that is soldered to a circuit contact of the substrate 6. Each base portion 19 that extends from the substrate connection 18 is formed so as to have a plate width that is wider than those of the substrate connection 18 and the contact spring piece 20 (FIG. 2), and press fitted protrusions 19a are formed on both ends of the base portion 19. Each press fitted protrusion 19a fixes the base portion 19 to the substrate-side housing 16 by being press fitted into a recessed holding portion 16d that is formed in the terminal holding portion 16c of the substrate-side housing 16 and that presses and holds the base portion 19 in the plate width direction. Each contact spring piece 20 extending from the corresponding base portion 19 through the inside of the corresponding terminal holding portions 16c towards the opening end side of the substrate-side housing 16 and bending therefrom towards the fitting chamber 16b is formed as a spring piece that protrudes in a mountain-like shape inside the fitting chamber 16b. By having contacts 20a that protrude in the fitting chamber 16b press and contact the harness-side connector 14 described later, the contact spring pieces 20 protruding in the fitting chamber 16b are elastically deformed and are pushed into the terminal holding portions 16c so as to be in conductive communication with the harness-side terminals 12 at a predetermined contact pressure.

3. Description of Harness-Side Connector 14

The harness-side connector 14 includes the harness-side housing 15 and the harness-side terminals 12. The harness-side housing 15 includes the fixed housing 9 and the movable housing 10.

(1) Description of Fixed Housing 9

The fixed housing 9 includes a housing main body 21 and a cover 22. A flange-shaped lid portion 21a that closes the opening end 4a of the front housing 4 is formed in the housing main body 21.

Furthermore, a step portion 21b that opens in the middle of the lid portion 21a, an accommodation portion 21c, and an insertion portion 21d are formed inside the housing main body 21 so as to be in communication with each other. The step portion 21b is a portion on which the cover 22 is placed, and an inner peripheral surface thereof has a relative shape that can fit the cover 22 therein.

Figure 6:
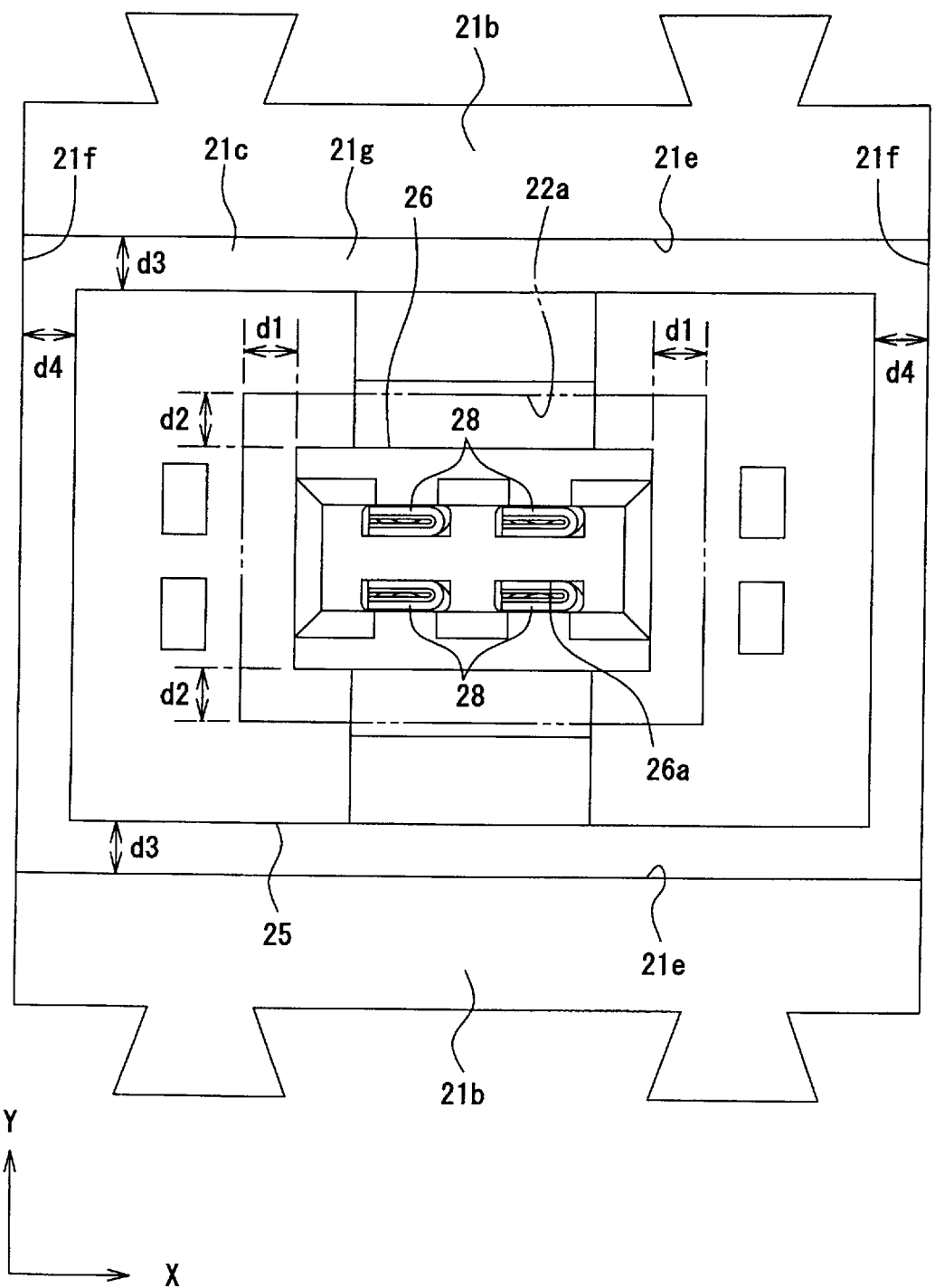
FIG. 6 is an explanatory drawing illustrating a movable area of the movable housing of the harness-side connector in FIGS. 1A and 1B.

An opening 22a into which a fitting connection 26 described later is inserted is formed in the cover 22. As illustrated in FIG. 6, movable gaps d1 that are movable widths extending in the X direction, and movable gaps d2 that are movable widths extending in the Y direction are formed between opening surfaces of the opening 22a and the fitting connection 26 such that the fitting connection 26 can be displaced in the area defined by the movable gaps d1 and d2.

Figure 5:
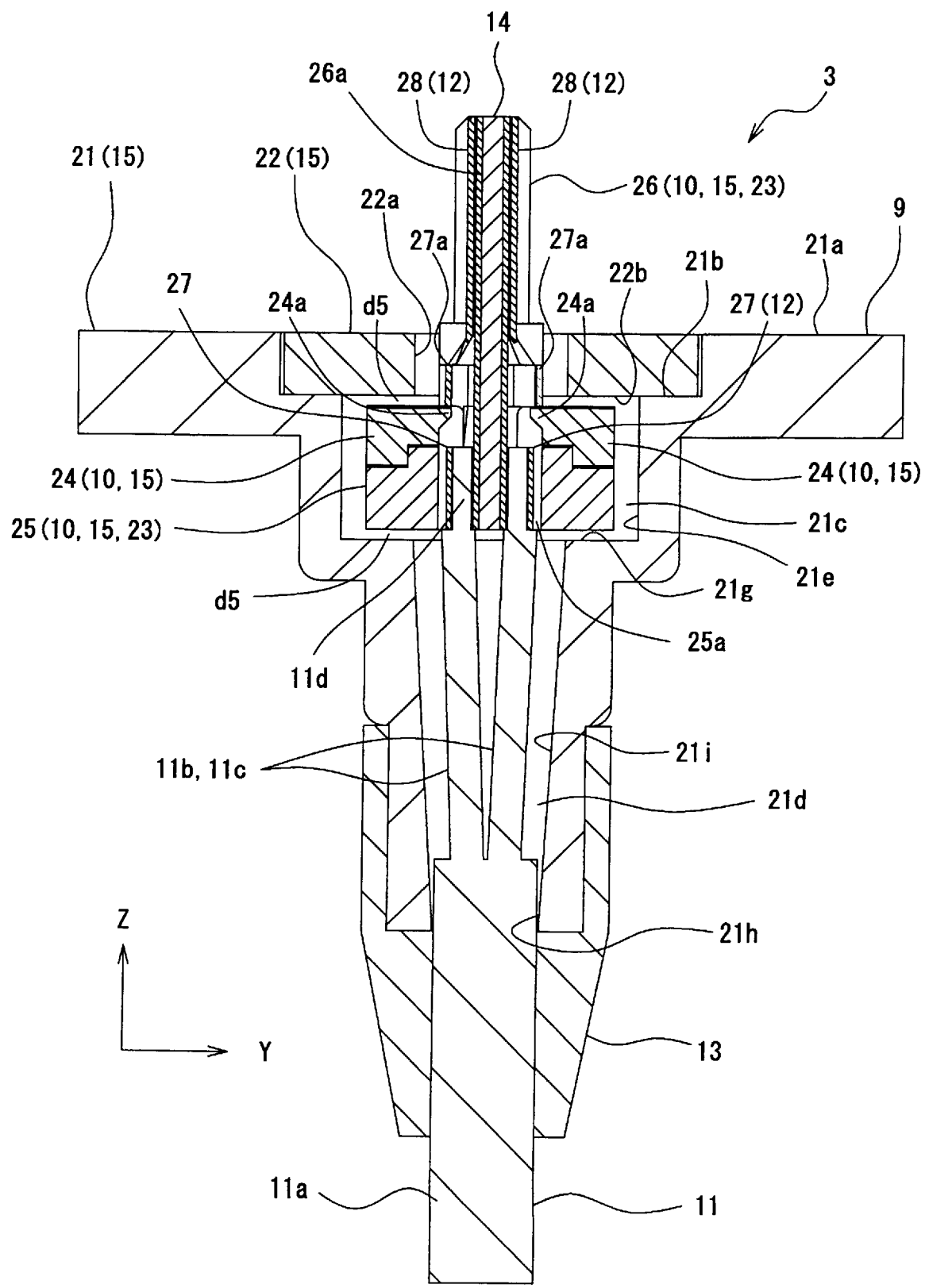
FIG. 5 is a cross-sectional view of the harness-side component in FIGS. 1A and 1B.

The accommodation portion 21c is a rectangular parallelepiped-shaped accommodation space that accommodates a base portion 25 of the movable housing 10 described later. As illustrated in FIG. 6, movable gaps d3 that are movable widths extending in the Y direction are formed between lateral sides 21e of the accommodation portion 21c extending in the X direction and the base portion 25, and movable gaps d4 that are movable widths that extend in the X direction are formed between lateral sides 21f of the accommodation portion 21c extending in the Y direction and the base portion 25. Furthermore, as illustrated in FIG. 5, movable gaps d5 that are movable widths extending in the Z direction are formed between a bottom surface 21g of the accommodation portion 21c and the base portion 25, and between a back surface 22b of the cover 22 and the base portion 25. Accordingly, the base portion 25 can be displaced in three-dimensional directions inside the accommodation portion 21c in the area defined by the movable gaps d3 to d5.

The insertion portion 21d is an accommodation space of the multi-core cable 11. The insertion portion 21d includes a tapered inner peripheral surface 21i that constricts from the accommodation portion 21c side towards an introducing port 21h of the multi-core cable 11, such that a truncated cone-shaped accommodation space is formed. A sheath 11a of the multi-core cable 11 is held in the insertion portion 21d on the introducing port 21h side, and a plurality of core wires 11b are exposed and extended from an end portion of the sheath 11a. Conducting wires 11d from which insulating coverings 11c have been removed are exposed at the distal ends of the core wires 11b, and are held by the harness-side terminals 12.

(2) Description of Movable Housing 10

The movable housing 10 includes a housing main body 23 and retainers 24. The housing main body 23 is a molded body made of synthetic resin, and the base portion 25 and the fitting connection 26 are formed therein.

Figure 3:
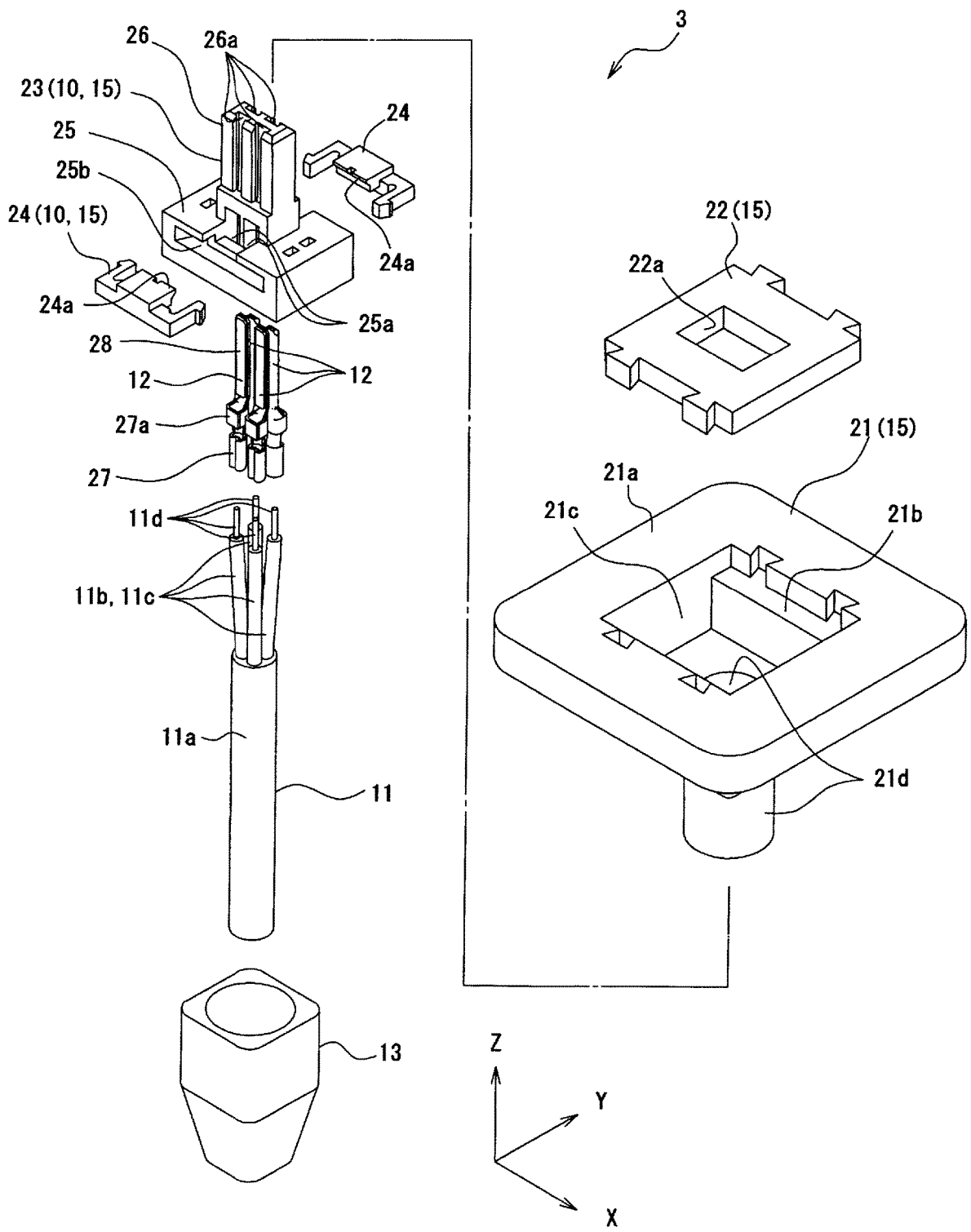
FIG. 3 is a perspective view of a harness-side component in FIGS. 1A and 1B.
Figure 4:
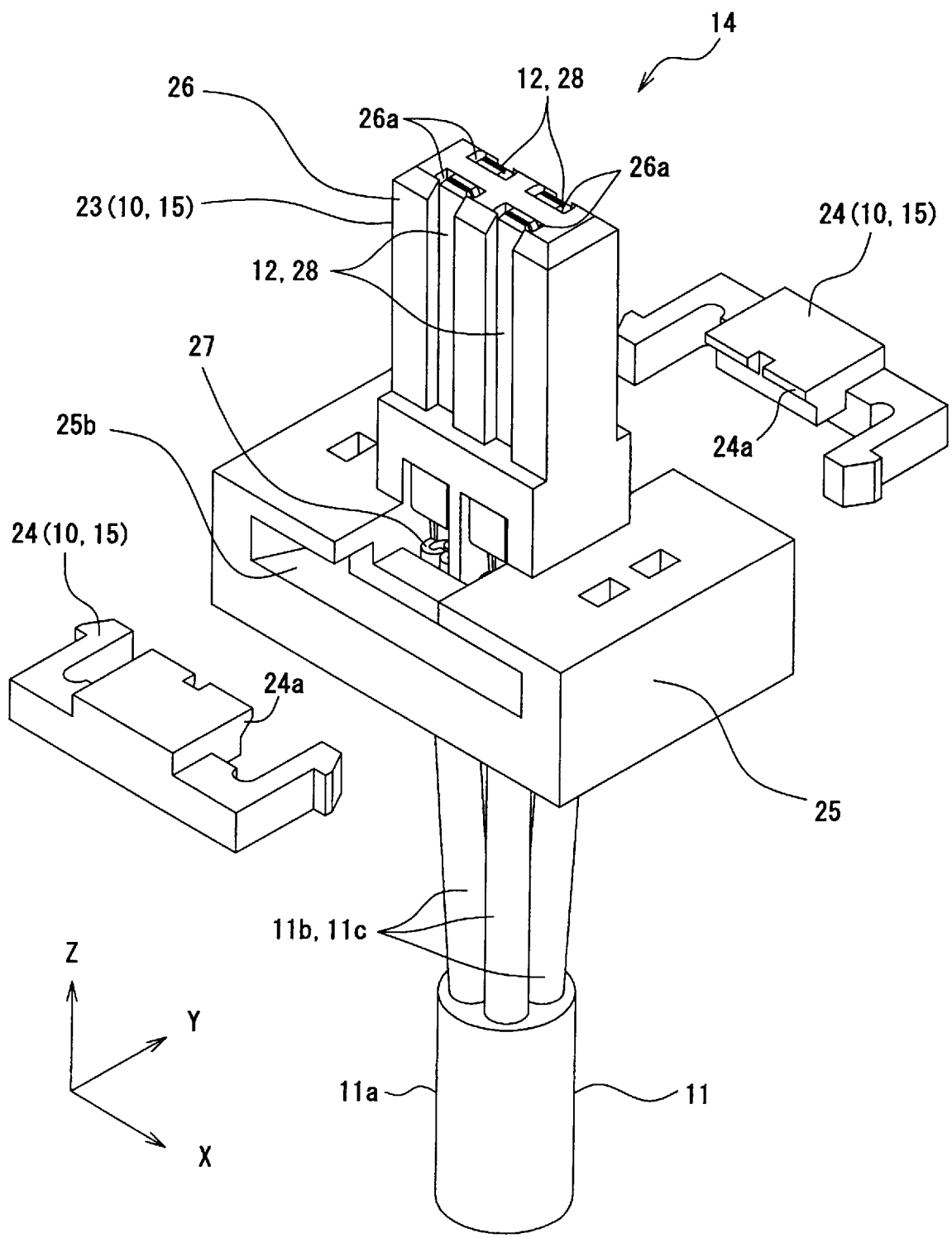
FIG. 4 is an explanatory drawing illustrating an assembling state of the movable housing of the harness-side component in FIGS. 1A and 1B.

Terminal attaching portions 25a of the harness-side terminals 12 are formed in the base portion 25, and an insertion portion 25b of the retainers 24 are formed so as to intersect and communicate with the terminal attaching portions 25a (FIGS. 3 and 4). By inserting the retainers 24 into the insertion portion 25b, lock projections 24a of the retainers 24 are locked to the harness-side terminals 12, such that the harness-side terminals 12 are retained with respect to the terminal attaching portions 25a.

The fitting connection 26 is a portion that is fitted and connected by being inserted into the fitting chamber 16b of the substrate-side connector 7 that is the connection mate. The fitting connection 26 is formed so as to protrude in a square columnar shape, and two groove-shaped terminal attaching portions 26a are formed in one surface and in another surface of the fitting connection 26 that extend in the longitudinal direction (the Z direction).

(3) Description of Harness-Side Terminals 12

The harness-side terminals 12 are so-called tab terminals, a conducting wire holding portion 27 and a contact 28 that are illustrated in FIG. 3 are formed therein. The conducting wires 11d of the core wires 11b of the multi-core cable 11 are held in the conducting wire holding portion 27. A gate-shaped projection 27a is formed in the conducting wire holding portion 27. The projection 27a abuts against the lock projections 24a of the retainers 24 in the falling off direction such that the harness-side terminals 12 are retained with respect to the housing main body 23. The contact 28 includes a tabular contact surface. The contact spring pieces 20 of the substrate-side terminals 17 described above come in conductive contact with the tabular contact surface.

4. Description of Fitting and Connecting Substrate-Side Connector 7 and Harness-Side Connector 14 to Each Other Features of fitting and connecting the substrate-side connector 7 and the harness-side connector 14 described above to each other will be described next.

As illustrated in FIG. 1B, the fitting connection 26 of the harness-side connector 14 is inserted into the fitting chamber 16b of the substrate-side connector 7 to form the image pickup apparatus 1 by putting the body-side component 2 and the harness-side component 3 together. Furthermore, when fitting and connecting is performed, it is ideal that the fitting connection 26 is inserted into the fitting chamber 16b in a straight manner; however, in most cases, there will be a positional displacement in the fitting position. Accordingly, the harness-side connector 14 is capable of absorbing the positional displacement by displacement of the movable housing 10 in three-dimensional directions caused by bending of the flexible core wires 11b.

Specifically, as illustrated in FIG. 6, in the X direction, the fitting connection 26 is capable of being displaced inside the opening 22a of the cover 22 with the movable gaps d1, and the base portion 25 is capable of being displaced inside the accommodation portion 21c with the movable gaps d4.

Figures 7A, 7B, 7C:
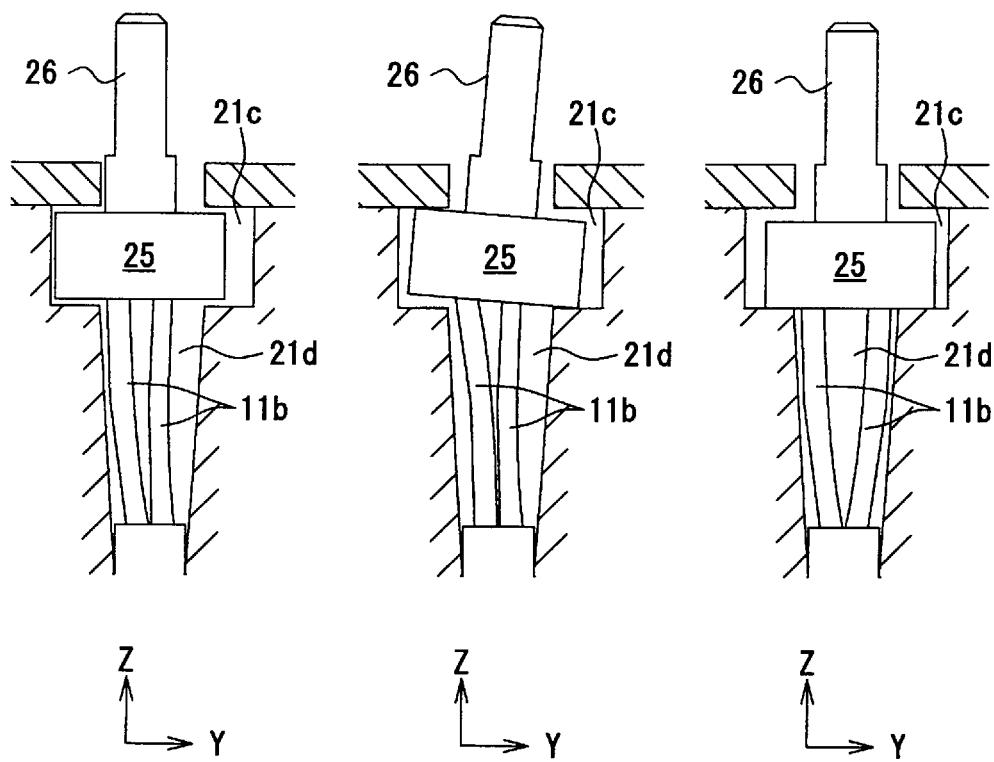
FIGS. 7A to 7C are explanatory drawings schematically illustrating operations of the moving housing of the harness-side connector in FIG. 1B.

In the Y direction, as illustrated in FIG. 7A, the fitting connection 26 is capable of being displaced inside the opening 22a of the cover 22 with the movable gaps d2, and the base portion 25 is capable of being displaced inside the accommodation portion 21c with the movable gaps d3.

Moreover, in the Z direction, which is a direction in which the harness-side connector 14 is fitted and connected to the substrate-side connector 7, as illustrated in FIGS. 5 and 7C, the base portion 25 is capable of being displaced inside the accommodation portion 21c with the movable gaps d5, which is technically significant for the image pickup apparatus 1 in the following manner.

In other words, there are cases in which the fitting position of the substrate 6 inside the front housing 4 is deviated towards the opening end 4a. In such a case, when the harness-side connector 14 is inserted into the substrate-side connector 7, deviation in the fitting position of the fitting connection 26 in the Z direction may cause the distal end thereof to press against and contact a bottom surface 16e of the fitting chamber 16b of the substrate-side connector 7, and the fitting connection 26 may deform the substrate 6 and may cause a defect, such as cracking in the soldered portions of the various elements mounted on the substrate 6. On the other hand, in the harness-side connector 14 of the exemplary embodiment, as illustrated in FIG. 7C, for example, the plurality of core wires 11b that extend inside the insertion portion 21d are, due to their flexibility, capable of being bent inside the insertion portion 21d. In particular, since the core wires 11b inside the insertion portion 21d are not covered by the sheath 11a, each of the core wires 11b can, due to its flexibility, be bent in a more flexible manner.

Accordingly, even if the fitting position of the substrate 6 inside the front housing 4 is deviated towards the opening end 4a, the core wires 11b bend and the base portion 25 is displaced towards the bottom surface 21g of the accommodation portion 21c such that the deviation of the fitting portion is absorbed; accordingly, inconvenience such as deformation of the substrate 6 caused by the distal end of the fitting connection 26 pressing and contacting the opposing bottom surface 16e of the fitting chamber 16b of the substrate-side connector 7 does not occur. Accordingly, the harness-side connector 14 of the present exemplary embodiment is capable of absorbing the deviation of the fitting position caused by the deviation in the fitting position of the substrate 6 that can occur at the assembling stage of the image pickup apparatus 1 and is capable of preventing a defect from occurring in the image pickup apparatus 1.

As described above, in the image pickup apparatus 1 including the harness-side connector 14, the positional of the fitting position in the X direction, the Y direction (FIG. 7A), an oblique direction (inclination) (FIG. 7B) can be absorbed with the displacement of the movable housing 10 in the three-dimensional directions, which is a combination of the X direction, the Y direction, and the Z direction (a positional displacement absorption function). Moreover, in a case in which the fitting position of the substrate 6 is deviated inside the front housing 4, pressing and contact against the substrate-side connector 7 can be avoided and inconvenience, such as the substrate 6 being deformed and a defect occurring in the soldered portions of the mounted elements, can be avoided (substrate protection function). Accordingly, a small and high-quality image pickup apparatus 1 can be obtained.

5. Description of Modifications of Exemplary Embodiment

In the exemplary embodiment described above, an example in which the harness-side connector 14 included four harness-side terminals 12 have been given; however, the number of harness-side terminals 12 may be any number. In line with the above, in the case of the multi-core cable 11 exemplified as a "linear conductor" that includes four core wires 11b as well, the number of core wires 11b can be any number and, furthermore, the core wires 11b may not be arranged together with the sheath 11a.

What is claimed is:

1. An image pickup apparatus comprising:
a first housing;
a second housing including a fixed housing and a movable housing;
a substrate-side connector provided in the first housing; and
a linear conductor that has flexibility and supports the movable housing in a displaceable manner,
wherein the movable housing is fitted and connected to the substrate side connector, and includes a base portion and a fitting connection,
the linear conductor has core wires extending from the base portion,
the fixed housing has an accommodation portion which accommodates the base portion and an insertion portion which accommodates the core wires,
movable gaps are provided between the accommodation portion and the base portion,
the core wires bend in a direction of an axis thereof and in a direction that intersects the axis inside the insertion portion according to a displacement of the base portion, the base portion is displaceable in three-dimensional directions inside the accommodation portion in the area defined by the movable gaps, and only the core wires support the base portion when the base portion is displaced.

2. The image pickup apparatus according to claim 1, wherein the core wires penetrate the base portion.

3. A harness-side connector provided in an image pickup apparatus including a first housing, a second housing, and a substrate-side connector provided in the first housing, the harness-side connector being fitted and connected to the substrate-side connector, the harness-side connector comprising:

a fixed housing and a movable housing that are provided in the second housing, the movable housing being fitted and connected to the substrate-side connector and including a base portion and a fitting connection; and a linear conductor that has flexibility and supports the movable housing in a displaceable manner, wherein the linear conductor has core wires extending from the base portion, the fixed housing has an accommodation portion which accommodates the base portion and an insertion portion which accommodates the core wires, movable gaps are provided between the accommodation portion and the base portion, the core wires bend in a direction of an axis thereof and in a direction that intersects the axis inside the insertion portion according to a displacement of the base portion, the base portion is displaceable in three-dimensional directions inside the accommodation portion in the area defined by the movable gaps, and only the core wires support the base portion when the base portion is displaced.

4. The harness-side connector according to claim 3, wherein the core wires penetrate the base portion.

* * * * *